(12) United States Patent
McCarthy et al.

(10) Patent No.: US 7,276,432 B2
(45) Date of Patent: Oct. 2, 2007

(54) FIBER INCORPORATING QUANTUM DOTS AS PROGRAMMABLE DOPANTS

(75) Inventors: Wil McCarthy, Lakewood, CO (US); Gary E Snyder, Edgewood, WA (US)

(73) Assignee: The Programmable Matter Corporation, Denver, CO (US)

( * ) Notice: Subject to any disclaimer, the term of this patent is extended or adjusted under 35 U.S.C. 154(b) by 0 days.

(21) Appl. No.: 11/081,778

(22) Filed: Mar. 16, 2005

(65) Prior Publication Data

US 2005/0157997 A1    Jul. 21, 2005

Related U.S. Application Data

(62) Division of application No. 09/964,927, filed on Sep. 26, 2001, now Pat. No. 6,978,070.

(60) Provisional application No. 60/312,264, filed on Aug. 14, 2001.

(51) Int. Cl.
*H01L 21/04* (2006.01)

(52) U.S. Cl. .................. 438/510; 257/9; 977/902

(58) Field of Classification Search ............. 438/510; 257/9
See application file for complete search history.

(56) References Cited

U.S. PATENT DOCUMENTS

| | | | |
|---|---|---|---|
| 5,530,263 A | 6/1996 | DiVincenzo | |
| 5,763,307 A * | 6/1998 | Wang et al. | 438/258 |
| 5,881,200 A | 3/1999 | Burt | |
| 5,889,288 A | 3/1999 | Futatsugi | |
| 5,937,295 A * | 8/1999 | Chen et al. | 438/257 |
| 6,040,859 A | 3/2000 | Takahashi | |
| 6,240,114 B1 | 5/2001 | Anselm et al. | |
| 6,281,519 B1 | 8/2001 | Sugiyama et al. | |
| 6,294,794 B1 | 9/2001 | Yoshimura et al. | |
| 6,304,784 B1 * | 10/2001 | Allee et al. | 607/116 |
| 6,320,220 B1 | 11/2001 | Watanabe et al. | |
| 6,329,668 B1 | 12/2001 | Razeghi | |
| 6,498,354 B1 | 12/2002 | Jefferson et al. | |
| 6,512,242 B1 | 1/2003 | Fan et al. | |

(Continued)

OTHER PUBLICATIONS

Goldhaber-Gordon, D., et al., "Overview of Nanoelectronic Devices," Proceedings of the IBEE, vol. 85, No. 4, Apr. 1997.

(Continued)

*Primary Examiner*—Chandra Chaudhari
(74) *Attorney, Agent, or Firm*—Hensley Kim & Holzer, LLC

(57) ABSTRACT

A programmable dopant fiber includes a plurality of quantum structures formed on a fiber-shaped substrate, wherein the substrate includes one or more energy-carrying control paths, which pass energy to quantum structures. Quantum structures may include quantum dot particles on the surface of the fiber or electrodes on top of barrier layers and a transport layer, which form quantum dot devices. The energy passing through the control paths drives charge carriers into the quantum dots, leading to the formation of "artificial atoms" with real-time, tunable properties. These artificial atoms then serve as programmable dopants, which alter the behavior of surrounding materials. The fiber can be used as a programmable dopant inside bulk materials, as a building block for new materials with unique properties, or as a substitute for quantum dots or quantum wires in certain applications.

16 Claims, 7 Drawing Sheets

U.S. PATENT DOCUMENTS

| | | | |
|---|---|---|---|
| 6,600,169 | B2 | 7/2003 | Stintz et al. |
| 6,611,640 | B2 | 8/2003 | LoCasclo et al. |
| 6,816,525 | B2 | 11/2004 | Li et al. |
| 7,026,641 | B2 | 4/2006 | Mohseni et al. |
| 2002/0080842 | A1 | 6/2002 | An et al. |
| 2003/0059998 | A1* | 3/2003 | Holonyak et al. .......... 438/200 |
| 2003/0066998 | A1 | 4/2003 | Lee |
| 2003/0107927 | A1 | 6/2003 | Yerushami et al. |

OTHER PUBLICATIONS

Kouwenhoven, Leo et al., "Quantum Dots," Physics World, Jun. 1988.

McCarthy, Wil, "Once upon a matter crushed," Jul. 1999, Science Fiction Age.

McCarthy, Wil, "Programmable matter," Oct. 2000, NATURE.

McCarthy, Wil, "The collapsium," Del Rey Books, Aug. 2000 and Orion Books, Oct. 2000.

Kastner, Marc A., "Artificial atoms," Physics Today, Jan. 1993.

Leatherdale, C.A., et al., "Photoconductivity in CdSe quantum dot solids," Phys. Review B, Jul. 15, 2000.

Turton, Richard, "The quantum dot," Oxford University Press, 1995.

C.T. Black et al., Integration of self-assembled diblock copolymers for semiconductor capacitor fabrication, Applied Physics Letters, vol. 79, No. 3 (Jul. 16, 2001), pp. 409-411, (American Inst. of Physics, NY).

Ting Xu et al., The influence of molecular weight on nanoporous polymer films, Polymer, 42 (Apr. 2001), pp. 9091-9095 (Elsevier Science Ltd.).

Du Yeol Ryu et al., A generalized approach to the modification of solid surfaces, Science, vol. 308 (Apr. 8, 2005), pp. 236-239.

Hyongsok T. Soh et al., Scanning probe lithography, ch. 3, pp. 40-66, (2001) (Kluwer Academic Publishers, Norwell MA).

* cited by examiner

US 7,276,432 B2

FIBER INCORPORATING QUANTUM DOTS AS PROGRAMMABLE DOPANTS

CROSS-REFERENCE TO RELATED APPLICATIONS

This application claims priority pursuant to 35 U.S.C. § 120 to and is a divisional application of U.S. patent application Ser. No. 09/964,927 filed 26 Sep. 2001 now U.S. Pat. No. 6,978,070 (the '927 application), which claimed the benefit pursuant to 35 U.S.C. § 119(e) of U.S. provisional patent application no. 60/312,264 filed 14 Aug. 2001 (the '264 application). The '927 and '264 applications are each hereby incorporated by reference in their entirety as though fully set forth herein.

BACKGROUND OF THE INVENTION

1. Field of the Invention

This invention relates to a device for producing quantum effects, namely a fiber that is capable of carrying energy with an exterior surface populated by quantum dot structures that are controlled by changes in the energy carried by the fiber. The invention has particular, but not exclusive, application in materials science as a programmable dopant that can be placed inside bulk materials and controlled by external signals.

2. Description of the Related Art

The fabrication of very small structures to exploit the quantum mechanical behavior of charge carriers (e.g., electrons or electron "holes") is well established. Quantum confinement of a carrier can be accomplished by a structure whose linear dimension is less than the quantum mechanical wavelength of the carrier. Confinement in a single dimension produces a "quantum well," and confinement in two dimensions produces a "quantum wire."

A quantum dot (QD) is a structure capable of confining carriers in all three dimensions. Quantum dots can be formed as particles, with a dimension in all three directions of less than the de Broglie wavelength of a charge carrier. Such particles may be composed of semiconductor materials (including Si, GaAs, InGaAs, InAlAs, InAs, and other materials), or of metals, and may or may not possess an insulative coating. Such particles are referred to in this document as "quantum dot particles." A quantum dot can also be formed inside a semiconductor substrate, through electrostatic confinement of the charge carriers. This is accomplished through the use of microelectronic devices of various design, e.g., a nearly enclosed gate electrode formed on top of a quantum well, similar to a P-N-P junction. Here, the term "micro" means "very small" and usually expresses a dimension of or less than the order of microns, i.e., thousandths of a millimeter. The term "quantum dot device" refers to any apparatus capable of generating a quantum dot in this manner. The generic term "quantum dot," abbreviated QD in certain drawings in this application, refers to any quantum dot particle or quantum dot device.

The electrical, optical, thermal, magnetic, mechanical, and chemical properties of a material depend on the structure and excitation level of the electron clouds surrounding its atoms and molecules. Doping is the process of embedding precise quantities of carefully selected impurities in a material in order to alter the electronic structure of the surrounding atoms, for example, by donating or borrowing electrons from them, and therefore altering the electrical, optical, thermal, magnetic, mechanical, or chemical properties of the material. Doping levels as low as one dopant atom per million atoms of substrate can produce measurable changes in the expected behavior of the pure material, for example, by altering the band gap of a semiconductor.

Quantum dots can have a greatly modified electronic structure from the corresponding bulk material, and therefore different properties. Quantum dots can also serve as dopants inside other materials. Because of their unique properties, quantum dots are used in a variety of electronic, optical, and electro-optical devices.

Kastner, "Artificial Atoms," Physics Today (January 1993) points out that the quantum dot can be thought of as an "artificial atom," since the carriers confined in it behave similarly in many ways to electrons confined by an atomic nucleus. The term "artificial atom" is now in common use, and is often used interchangeably with "quantum dot." However, for the purposes of this document, "artificial atom" refers specifically to the pattern of confined carriers (e.g., an electron gas), and not to the particle or device in which the carriers are confined.

The term "programmable dopant fiber" refers to a wire or fiber with quantum dots attached to, embedded in, or formed upon its outer surface. This should not be confused with a quantum wire, which is a structure for carrier confinement in two dimensions only.

Quantum dots are currently used as near-monochromatic fluorescent light sources, laser light sources, light detectors (including infra-red detectors), and highly miniaturized transistors, including single-electron transistors. They can also serve as a useful laboratory for exploring the quantum mechanical behavior of confined carriers. Many researchers are exploring the use of quantum dots in artificial materials, and as dopants to affect the optical and electrical properties of semiconductor materials.

Kastner describes the future potential for "artificial molecules" and "artificial solids" composed of quantum dot particles. Specifics on the design and functioning of these molecules and solids are not provided. Leatherdale et. al., Photoconductivity in CdSe Quantum Dot Solids," Physics Review B (15 Jul. 2000) describe, in detail, the fabrication of "two- and three-dimensional . . . artificial solids with potentially tunable optical and electrical properties." These solids are composed of colloidal semiconductor nanocrystals deposited on a semiconductor substrate. The result is an ordered, glassy film composed of quantum dot particles, which can be optically stimulated by external light sources, or electrically stimulated by attached electrodes, to alter its optical and electrical properties. However, these films are extremely fragile, and are "three dimensional" only in the sense that they have been made up to several microns thick. In addition, the only parameter that can be adjusted electrically is the average number of electrons in the quantum dots. Slight variations in the size and composition of the quantum dot particles mean that the number of electrons will vary slightly between dots. However, on average the quantum dot particles will all behave similarly.

The embedding of metal and semiconductor nanoparticles inside bulk materials (e.g., lead particles in leaded crystal) is also well established. These nanoparticles are quantum dots with characteristics determined by their size and composition. They also serve as dopants for the material in which they are embedded to alter selected optical or electrical properties. However, there is no means or pathway by which these quantum dot particles can be stimulated electrically. Thus, the doping characteristics of the quantum dots are fixed at the time of manufacture and cannot be adjusted thereafter.

In general, the prior art almost completely overlooks the broader materials-science implications of quantum dots. The ability to place programmable dopants in a variety of materials implies a useful control over the bulk properties of these materials. This control could take place not only at the time of fabrication of the material, but also in real time, i.e., at the time of use, in response to changing needs and conditions. However, there is virtually no prior art discussing the use, placement, or control of programmable quantum dots in the interior of bulk materials. Similarly, there is no prior art discussing the placement of quantum dots on the surface of an electrically or optically conductive fiber.

U.S. Pat. No. 5,881,200 to Burt (1999) discloses an optical fiber (1) containing a central opening (2) filled with a colloidal solution (3) of quantum dots (4) in a support medium. (See prior art FIGS. 1 and 2.) The purpose of the quantum dots is to produce light when optically stimulated, for example, to produce optical amplification or laser radiation. The quantum dots take the place of erbium atoms, which can produce optical amplifiers when used as dopants in an optical fiber. This fiber could be embedded inside bulk materials, but could not alter the properties of such materials since the quantum-dot dopants are enclosed inside the fiber. In addition, no means is described for exciting the quantum dots electrically. Thus the characteristics of the quantum dots are not programmable, except in the sense that their size and composition can be selected at the time of manufacture.

U.S. Pat. No. 5,889,288 to Futatsugi (1999) discloses a semiconductor quantum dot device that uses electrostatic repulsion to confine electrons. This device, as shown in prior art FIGS. 3A and 3B consists of electrodes (16a, 16b, and 17) controlled by a field effect transistor, both formed on the surface of a quantum well on a semi-insulating substrate (11). This arrangement permits the exact number of electrons trapped in the quantum dot (QD) to be controlled, simply by varying the voltage on the gate electrode (G). This is useful, in that it allows the "artificial atom" contained in the quantum dot to take on characteristics similar to any natural atom on the periodic table, and also to transuranic and asymmetric atoms which cannot easily be created by other means. Unfortunately, the two-dimensional nature of the electrodes means that the artificial atom can exist only at or near the surface of the wafer, and cannot serve as a dopant to affect the wafer's interior properties.

Turton, "The Quantum Dot," Oxford University Press (1995) describes the possibility of placing quantum dot devices in two-dimensional arrays on a semiconductor microchip, explicitly as a method for producing new materials through programmable doping of the substrate. This practice has since become routine, although the spacing of the quantum dot devices is typically large enough that the artificial atoms formed on the chip do not interact significantly, nor produce macroscopically significant doping. Such a chip also suffers from the limitation cited in the previous paragraph: its two-dimensional structure prevents its being used as a dopant except near the surface of a material or material layer.

Goldhaber-Gordon et al., "Overview of Nanoelectronic Devices," Proceedings of the IEEE, v. 85, n.4 (April 1997) describe what may be the smallest possible single-electron transistor. This consists of a "wire" made of conductive $C_6$ (benzene) molecules, with a "resonant tunneling device" or RTD inline that consists of a benzene molecule surrounded by $CH_2$ molecules that serve as insulators. The device is described (incorrectly, we believe) as a quantum well rather than a quantum dot, and is intended as a switching device (transistor) rather than a confinement mechanism for charge carriers. However, in principle the device should be capable of containing a small number of excess electrons and thus form a primitive sort of artificial atom. Thus, the authors' remark on page 532 that the device may be "much more like a quantum dot than a solid state RTD." The materials science implications of this, are not discussed.

McCarthy, "Once Upon a Matter Crushed," Science and Fiction Age (July 1999), in a science fiction story, includes a fanciful description of "wellstone," a form of "programmable matter" made from "a diffuse lattice of crystalline silicon, superfine threads much finer than a human hair," which use "a careful balancing of electrical charges" to confine electrons in free space, adjacent to the threads. This is probably physically impossible, as it would appear to violate Coulomb's Law, although we do not wish to be bound by this. Similar text by the same author appears in McCarthy, The Collapsium," Del Rey Books (August 2000) and McCarthy, "Programmable Matter," Nature (05 Oct. 2000). Detailed information about the composition, construction, or functioning of these devices is not given.

SUMMARY OF THE INVENTION

It is a general object of the present invention to use quantum dots to produce a plurality of real-time programmable dopants in materials. In one embodiment, an energy-transporting fiber is disclosed that controls the properties of quantum dot dopants using external energy sources, even when the dopants are embedded in solid materials, including opaque or electrically insulating materials that would ordinarily isolate the quantum dots from external influences.

A programmable dopant fiber may be composed of a fiber-shaped material with a plurality of quantum dot particles or quantum dot devices populating the surface of the fiber. The fiber further contains one or more control paths, which carry energy to the quantum dots in order to control their confinement of charge carriers.

According to the present invention, charge carriers are driven into quantum confinement in the quantum dots by the energy in the control paths such that they form artificial atoms that serve as dopants for the surrounding materials. The atomic number of each artificial atom is adjusted through precise variations or modulations in the voltage across the quantum dot that confines it. This alters the doping characteristics of the artificial atoms.

In some embodiments of the present invention, the excitation level of the artificial atom is also controlled, either through additional electrical voltages or through optical or electromagnetic stimulation. Additionally, in some embodiments of the invention the energy in the control paths creates electric fields which affect the quantum confinement characteristics of the quantum dots, producing controlled and repeatable distortions in the size and shape of the artificial atoms, further altering their doping characteristics, with a corresponding effect on the surrounding materials. Since the electrical, optical, thermal, magnetic, mechanical, and chemical properties of a material depend on its electronic structure, and since the embedding of dopants can affect this structure, the programmable dopant fiber offers a means of controlling the interior properties of bulk materials in real time.

The present invention provides a three-dimensional structure for quantum dots that can be considerably more robust than a nanoparticle film. For example, a contiguous GaAs fiber or metal wire is held together by atomic bonds, as opposed to the much weaker Van der Waals forces which hold nanoparticle films together.

The present invention also provides a method for the electrical and/or optical stimulation of quantum dot particles embedded inside bulk materials. The fiber may consist of, or include, one or more wires, optical conduits, or other energy pathways that are electrically and/or optically isolated from the material in which they are embedded. These pathways branch directly to the quantum dot particles or devices on the surface of the fiber, providing the means to stimulate them.

The present invention further provides a method for embedding and controlling electrostatic quantum dot devices (and potentially other types of quantum dot devices) inside bulk materials, rather than at their surfaces. With the present invention, the doping characteristics of quantum dots inside a material can be controlled by external signals, and thus varied by a user at the time of use. Thus, the properties of the bulk material can be tuned in real time, in response to changing needs or circumstances.

According to the present invention, the programmable dopant fiber can be used outside of bulk materials, in applications where quantum dots, quantum wires, and nanoparticle films are presently used. For example, the programmable dopant fiber can serve as a microscopic light source or laser light source that is both long and flexible. Further, multiple programmable dopant fibers can be arranged on a surface to produce two-dimensional materials analogous to nanoparticle films, but much stronger.

Also, according to the present invention, multiple programmable dopant fibers can be woven, braided, or otherwise arranged into three-dimensional structures whose properties can be adjusted through external signals, forming a type of "programmable matter." This programmable matter may be a bulk solid with electrical, optical, thermal, magnetic, mechanical, and chemical properties that can be tuned in real time through the adjustment of the energies in the control paths, which affect the properties of artificial atoms used as dopants. The resulting programmable materials, unlike nanoparticle films, can contain artificial atoms of numerous and wildly different types, if desired. Thus, the number of potential uses for the programmable dopant fiber materials is vastly greater than for the materials based on nanoparticle films.

BRIEF DESCRIPTION OF THE DRAWINGS

In the drawings, closely related figures have the same element numbers, except for FIGS. 1-3B from the prior art.

DETAILED DESCRIPTION OF THE INVENTION

Figures 1, 2:
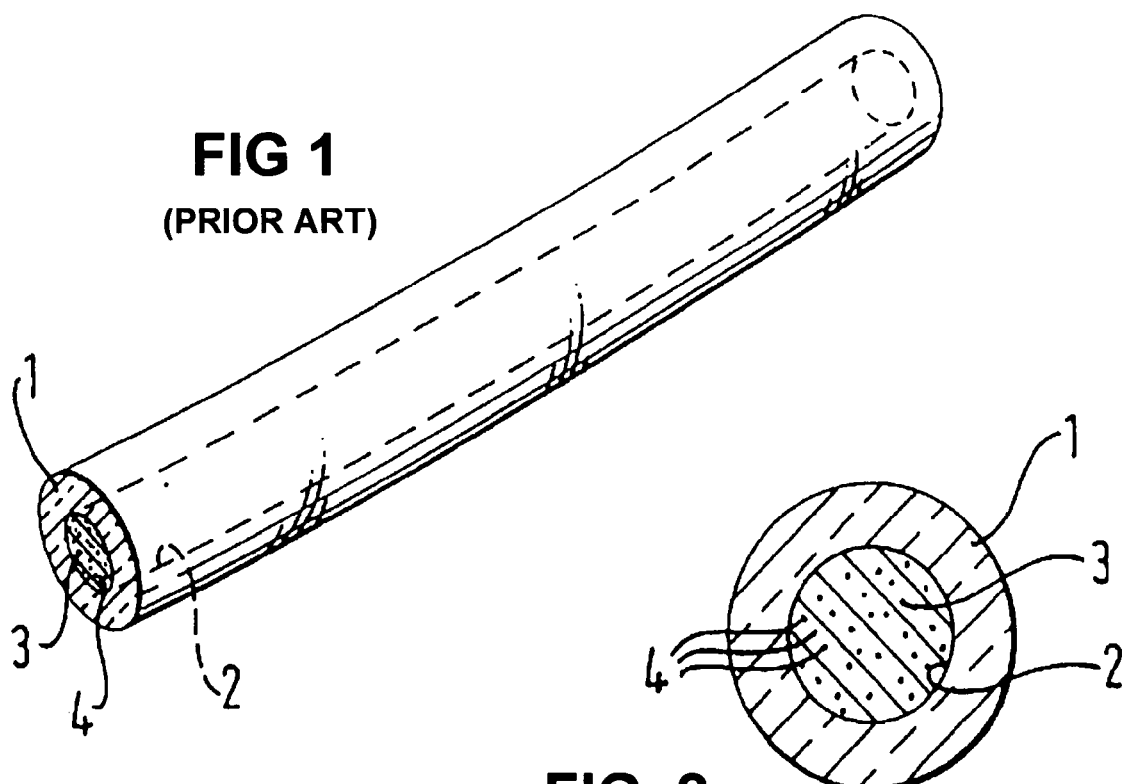
FIGS. 1 and 2 are from the prior art, U.S. Pat. No. 5,881,200 to Burt (1999), and show a hollow optical fiber containing a colloidal solution of quantum dots in a support medium.
Figure 3A:
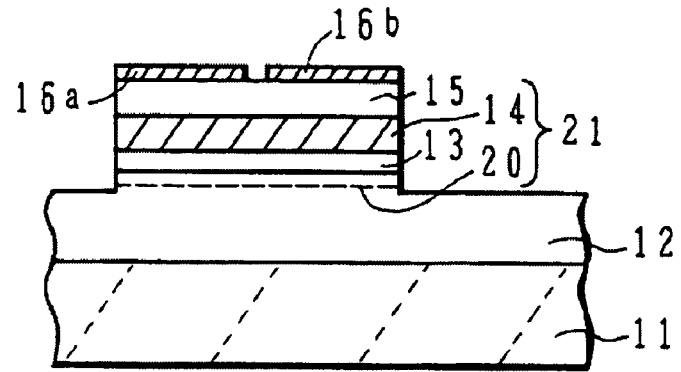
FIGS. 3A and 3B are from the prior art, U.S. Pat. No. 5,889,288 to Futatsugi (1999), and show a semiconductor quantum dot device that uses electrostatic repulsion to confine electrons.
Figure 3B:
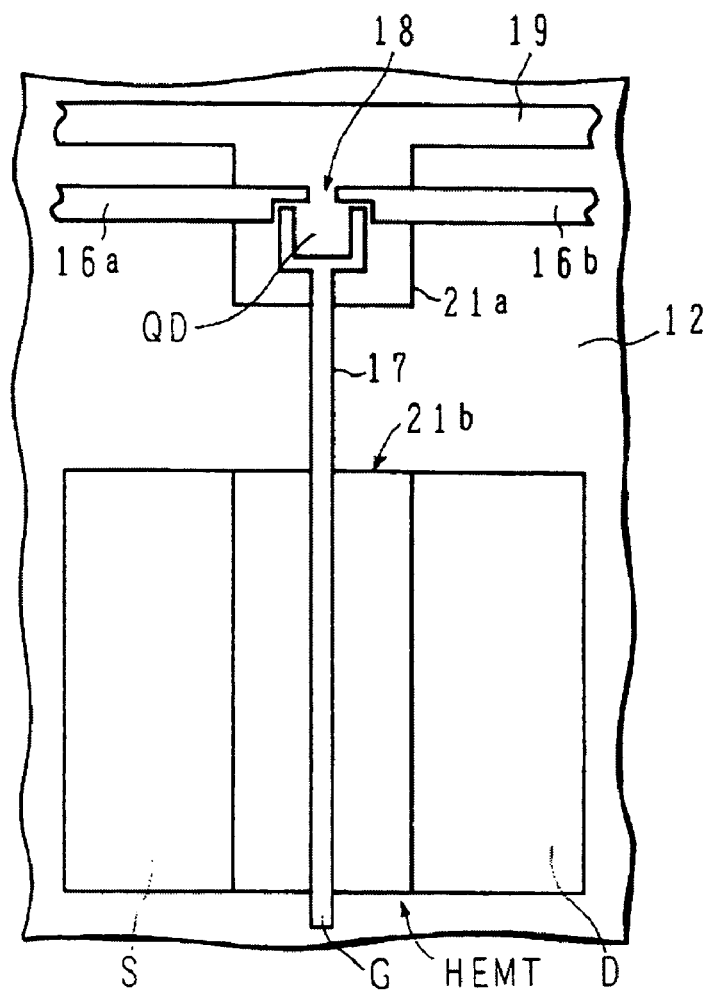
Figure 4A:
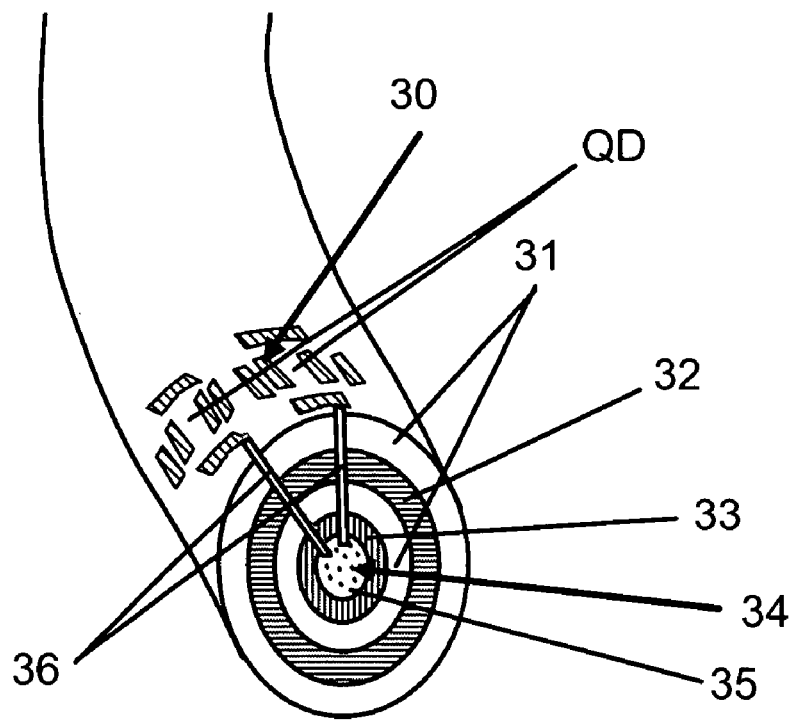
FIGS. 4A and 4B are schematic drawings of a first embodiment of the present invention detailing a multilayered microscopic fiber that includes a quantum well, surface electrodes, which form quantum dot devices, and control wires to carry electrical signals to the electrodes.

FIGS. 4A (isometric view) and 4B (end view) show a preferred embodiment of the invention, which is a fiber containing control wires 34 in an insulating medium 35, surrounded by a quantum well, plus an optional memory layer 33. The preferred composition of the insulator 35 is a semiconductor oxide, although a variety of other materials could be used. The preferred composition of the quantum well is a central or transport layer 32 of a semiconductor (similar to the negative layer of a P-N-P junction), for example, GaAs, surrounded by barrier or supply layers 31 of a semiconductor with higher conduction energy (similar to the positive layers of a P-N-P junction). Because of the difference in conduction energies, electrons "fall" preferentially into the lower energy of the transport layer 32, where they are free to travel horizontally (that is, within the layer) but are confined vertically (perpendicular to the layer) by the higher conduction energy of the barrier layers. However, the present invention is not limited to this particular configuration, and includes quantum wells made from other materials and with other designs, as well as quantum wells designed to trap "holes" or other charge carriers.

The transport layer 32 of the quantum well must be smaller in thickness than the de Broglie wavelength of the charge carriers for the charge carriers to be confined in it. For an electron at room temperature, this would be approximately 20 nanometers. Thicker quantum wells are possible, although they will only exhibit quantum confinement of the charge carriers at temperatures colder than room temperature. Thinner quantum wells will operate at room temperature, and at higher temperatures so long as the de Broglie wavelength of the carriers does not exceed the thickness of the transport layer 32.

The surface of the fiber includes conductors that serve as the electrodes 30 of a quantum dot device. These electrodes 30 confine charge carriers in the quantum well into a small space or quantum dot (QD) when a reverse-bias voltage is applied, since the negative charge on the electrodes 30 repels electrons, preventing their horizontal escape through the transport layer. The electrodes 30 are powered by control wire branches 36 reaching to the surface of the fiber from the control wires 34 in the center of the fiber. In the preferred embodiment, the electrodes 30, control wires 34, and control wire branches 36 are made of gold, although in principle they could be made of other metals, or other materials, such as semiconductors or superconductors.

Once the charge carriers are trapped in a quantum dot (QD), they form an artificial atom that is capable of serving as a dopant. Increasing the voltage on the electrodes 30 by a specific amount forces a specific number of additional carriers into the quantum dot (QD), altering the atomic number of the artificial atom trapped inside. Conversely, decreasing the voltage by a specific amount allows a specific number of carriers to escape to regions of the transport layer 32 outside the quantum dot (QD). One embodiment of the invention shown in FIG. 4A provides six electrodes 30 for each quantum dot device (QD), although more or less could be used. By selecting the voltages applied to these electrodes 30 it is possible to alter the repulsive electric field, thus affecting size and shape of the quantum dot (QD) confinement region. Changes to the confinement region similarly alter the size and shape of the artificial atom trapped inside the quantum dot (QD), either in conjunction with changes to the artificial atom's atomic number or while holding the atomic number constant. Thus, the doping properties of the artificial atom are adjusted in real time through variations in the signal voltage of the control wires 34 at the fiber's center.

There are various possibilities for making the programmable dopant fiber of different materials, and in different configurations. The most advantageous configurations are the smallest, since smaller quantum dots can contain charge carriers at higher energies (shorter de Broglie wavelengths) and thus display atom-like behavior at higher temperatures. The smallest conceivable programmable dopant fiber would be similar in design to the single-electron transistor described in Goldhaber-Gordon et al., although molecules the size of benzene rings or smaller, if employed as quantum dot particles, will be unable to hold large numbers of excess charge carriers. This limits their usefulness in generating artificial atoms. A somewhat larger but more practical design is to employ electrically conductive nanotubes, such as a carbon nanotubes, as the control wire segments 34, and fullerene-type molecules, such as carbon fullerenes (for example, the quantum dot particles 37 of FIGS. 5A and 5B).

Figure 4B:
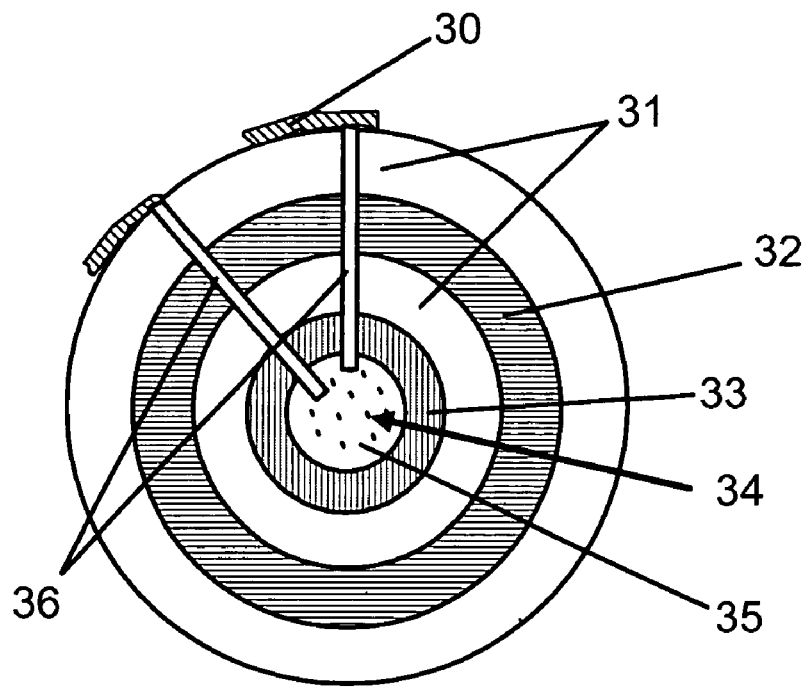
Figure 4C:
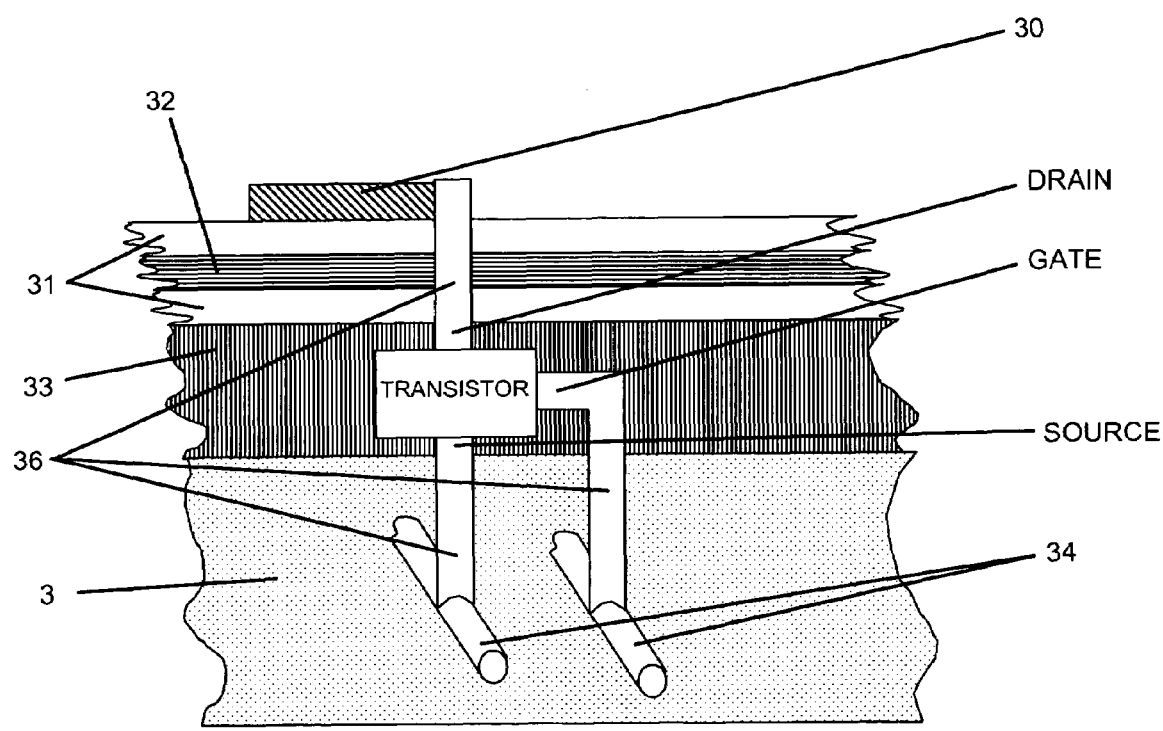
FIG. 4C is a schematic drawing of an alternative to the embodiment of FIGS. 4A and 4B including an optional memory layer.

FIG. 4C shows the optional memory layer 33, which may be formed of microscopic transistors or other switches placed inline with the control wire branches 36 that are capable of turning voltages to the surface electrodes 30 on and off. The ends of the control wire branch 36 may serve as the source and drain electrodes of the switch, and an additional control wire branch 36 is extended from a central control wire 34 to serve as the gate electrode for the switch. The switch may be a field effect transistor, although numerous other types of switches may be used without affecting the function of the invention. This switching or memory layer is optional, since this switching can be accomplished external to the fiber. It is included here for clarity. However, the present invention should not be limited to this particular configuration, and may include quantum dot devices made of other materials or of alternative designs, including devices protected by an additional insulating layer (not pictured), either continuous or discontinuous, on top of the electrodes 30 at the surface of the fiber.

Note that the exact arrangement of the various layers can be slightly different than depicted here without altering the essential functioning of the programmable dopant fiber. For example, the cross-section may be any oval or polygon shape, or may be flat (as in a ribbon), and the insulated control wires 34 need not be located at the fiber's center, although that may be the most convenient place to locate them.

The preferred manner of using the programmable dopant fiber is to place the fiber or a plurality of fibers, as needed, inside a bulk material (e.g., a semiconductor), or to weave or braid them together into a two- or three-dimensional structure. Barrier layers 31 and transport layer 32 form a quantum well, which traps charge carriers in a quantum (wavelike) manner in the central or transport layer 32. An electrical potential is then applied across the quantum wells through the control wires 34 from an external source. Energy motivated by the applied voltage flows from the control wires 34 to the control wire branches 36 and then to electrodes 30 on the surface of the fiber. Alternatively, the control wire branches 36 may pass through the optional memory layer 33. The memory layer 33 may be composed of in-line transistors or other switches, embedded in an insulating medium, which are capable of switching the electrical pathways open or closed. From the memory layer 33, the control wire branches 36 then lead to the electrodes 30 at the surface of the fiber. Once the electrical potential is applied across the electrodes 30, the change in voltage creates an electrostatic repulsion that affects the carriers trapped in the quantum well, herding them into small areas known as quantum dots where they form artificial atoms.

Adjustment of the voltages across the electrodes 30 can then affect the characteristics of the artificial atoms, including: size; shape or symmetry; number of charge carriers; and energy levels of the carriers. The resulting changes in the artificial atom can dramatically affect its properties as a dopant. Depending on the number of control wires 34 inside the fiber and the number of quantum dot devices (QD) along its surface, the artificial atoms created in the confinement layer 32 may all be identical, may represent multiple "artificial elements" in regular or irregular sequences, or may all be different. For example, if the signals sent to each quantum dot device (QD) were identical, the artificial atoms on the fiber might all have an atomic number of 2, equivalent to helium, which would otherwise be extremely difficult to introduce as a dopant. Conversely, if two separate sets of control signals were sent, the artificial atoms could be an alternating pattern of helium (atomic number 2) and carbon (atomic number 6).

Figure 5A:
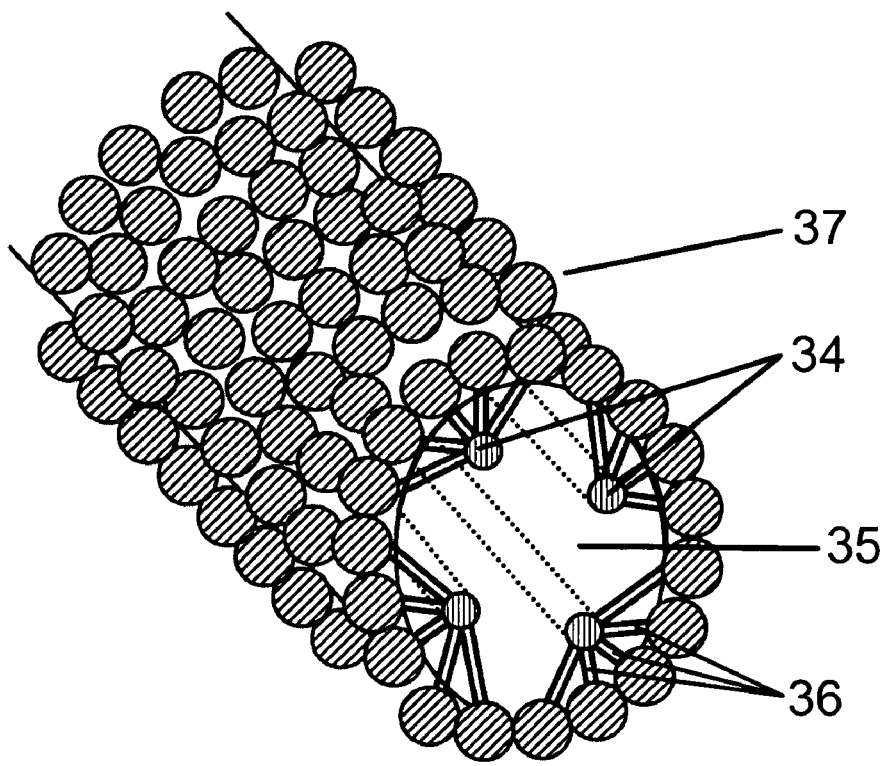
FIGS. 5A and 5B are schematic drawings of a second embodiment of the present invention, in which quantum dot particles are positioned on the surface of the fiber.

FIGS. 5A (isometric view) and 5B (end view) show an additional embodiment of the invention, in which the fiber comprises multiple control wires 34 surrounded by insulation 35, with control wire branches 36 leading to quantum dot particles 37 on the surface of the fiber. An optional memory layer (not shown) may be included in the fiber of this embodiment as well. In this embodiment, the control wires are conductors, but they could also be semiconductors, or superconductors, optical fibers, or other types of conduits for carrying energy to stimulate the quantum dot particles 37. The dimensions can cover a broad range of microscopic values while retaining useful optical, electrical, and other properties for the programmable dopant fiber.

Because they are easily self-assembled in chemical solutions, the quantum dot particles 37 may be spherical nanocrystals consisting of a core of semiconductor material surrounded by a passivating shell of crystalline organic material. Dimensions of the core should not exceed the de Broglie wavelength of the carriers to be confined within it. However, the invention is not limited to this particular configuration, and may include quantum dot particles of other shapes or made using other materials and methods. Quantum dot particles may be deposited onto the fiber, for example, by evaporation. Attachment to the fiber is readily accomplished by means of van der Waals forces, although active "molecular tethers" may be added to the shell and/or fiber in order to bond the quantum dot particle 37 chemically to the insulator 35 or to the control wire branches 36.

The operation of this embodiment is very similar to the embodiment of FIGS. 4A-4C, with the exception that the carriers are confined in quantum dot particles 37 rather than by electrostatic repulsion and a quantum well. Electrical (or optical) energy is applied to the control wires 34 from an external source, and further to the surface of the fiber via control wire branches 36. An electrical potential is then created across the quantum dot particles 37. Placing the fiber adjacent to a grounded conductive or semiconductive material, including another programmable dopant fiber, produces a ground path from the control wire branches 36 and then through the quantum dot particles 37. This creates the electrical potential across the quantum dot particles 37 and forces the charge carriers into quantum confinement inside them, where they form artificial atoms. Increasing the voltage across the control wires 34 drives additional carriers into the quantum dot particles 37, increasing the atomic number of the artificial atoms inside them.

Additionally, electrical or optical energy passed through the control wires 34 can increase the excitation level of the artificial atoms. This stimulation can thus affect the properties of the artificial atoms contained in the quantum dot particles 37, including the number of carriers and the energy levels of the carriers. As before, the resulting changes in the artificial atom can dramatically affect its properties as a dopant.

Depending on the number of control wires inside the fiber and the number of quantum dot particles along its surface, the artificial atoms located in the quantum dot particles may all be identical, may represent multiple "artificial elements" in regular or irregular sequences, or may all be different. In the case of the specific embodiment shown in FIGS. 5A and 5B, there are four control paths. Therefore, each quarter-arc of the surface of the fiber may receive different control signals and display different doping characteristics. Thus, the fiber may have up to four "stripes" of different dopant running along its length.

Figure 6A:
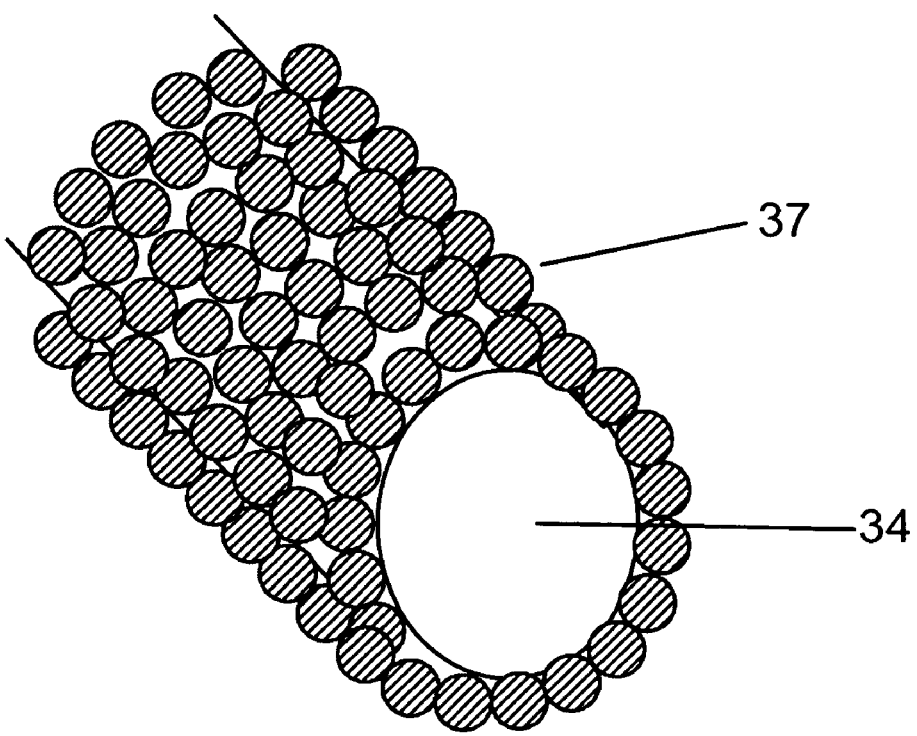
FIGS. 6A and 6B are schematic drawings of a third embodiment, in which the fiber comprises a single control wire with quantum dot particles attached to its exterior surface.

FIGS. 6A (isometric view) and 6B (end view) show another additional embodiment, in which quantum dot particles 37 are attached to the surface of a non-insulated control wire 34. In general, this wire may be an electrical conductor, but could be another type of conduit for carrying energy to stimulate the quantum dot particles, for example, a semiconductor, superconductor, or optical fiber. Dimensions can once again cover a broad range of microscopic values.

Because they are easily self-assembled in chemical solutions, the quantum dot particles 37 may be spherical nanocrystals consisting of a core of semiconductor material surrounded by a passivating shell of crystalline organic material. Dimensions of the core should not exceed the de Broglie wavelength of the carriers to be confined within it. However, the invention is not limited to this particular configuration, and may include quantum dot particles 37 of other shapes or made using other materials and methods. Quantum dot particles 37 may be deposited onto the fiber, for example, by evaporation. Attachment to the fiber is readily accomplished by means of van der Waals forces, although active "molecular tethers" may be added to the shell and/or fiber in order to bond the quantum dot particle 37 chemically to the control wire 34.

Figure 5B:
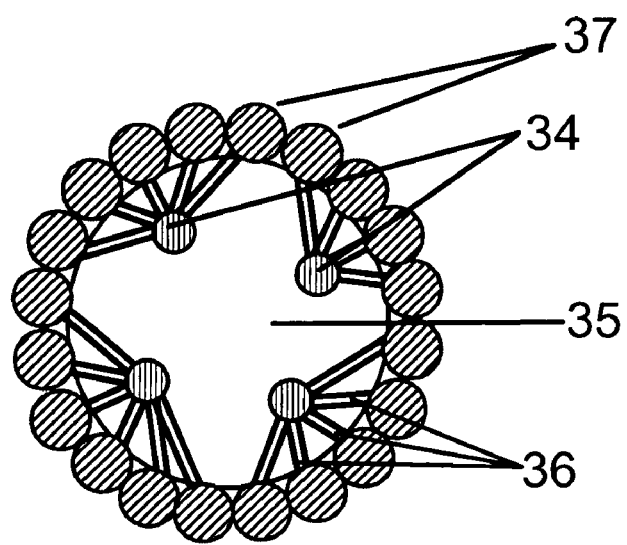

The operation of this embodiment is similar to that of FIGS. 5A and 5B, with the exception that the fiber comprises a single control wire 34, with quantum dot particles 37 attached to its outer surface. Once again, the quantum dot particles 37 are stimulated by a current (or optical energy) passing through the control wire 34 to a ground path that includes the quantum dot particles 37). This creates a voltage across the quantum dot particles 37 and forces the charge carriers into quantum confinement inside them, where they form artificial atoms. Increasing the voltage across the control wire 34 drives additional carriers into the quantum dot particles 37, increasing the atomic number of the artificial atoms inside them.

This stimulation can then affect the properties of the artificial atoms contained in the quantum dot particles, including the number of carriers and the energy levels of the carriers. As before, the resulting changes in the artificial atom can dramatically affect its properties as a dopant. The capabilities of this embodiment are more limited, in that (barring minor variations in the size and composition of the quantum dot particles 37) all the artificial atoms along the fiber cannot be controlled separately or in subgroups, and will therefore have the same characteristics. No controlled patterning of different artificial dopant species is possible, except at the time of manufacture.

Figure 7A:
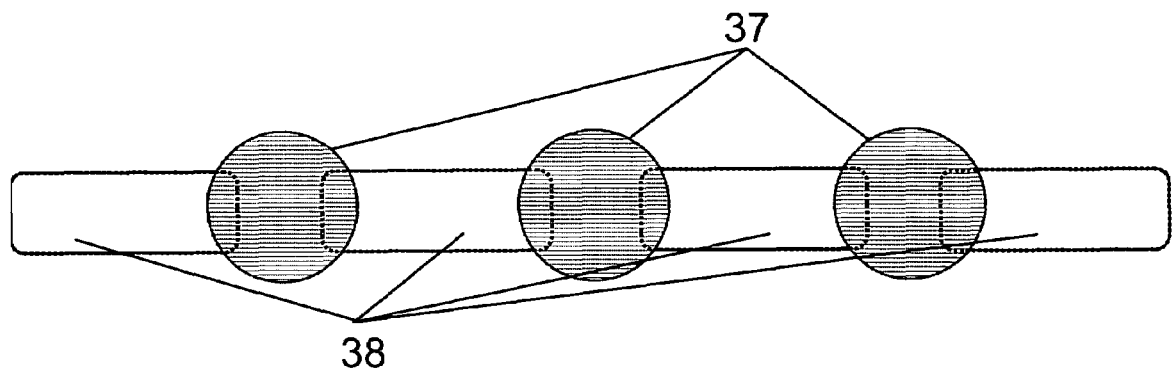
FIGS. 7A and 7B are schematic drawings of still another alternative embodiment of the present invention showing an ordered chain of quantum dot particles alternating with control wire segments.
Figure 7B:
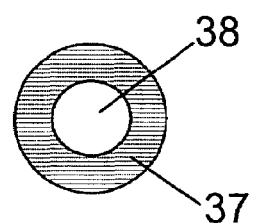

FIGS. 7A (isometric view) and 7B (end view) show still another additional embodiment, in which control wire segments 38 alternate with quantum dot particles 37. The dimensions of both the control wire segments 38 and the quantum dot particles 37, while generally microscopic, could cover a broad range of values while retaining useful optical, electrical, and other properties for the programmable dopant fiber.

Figure 6B:
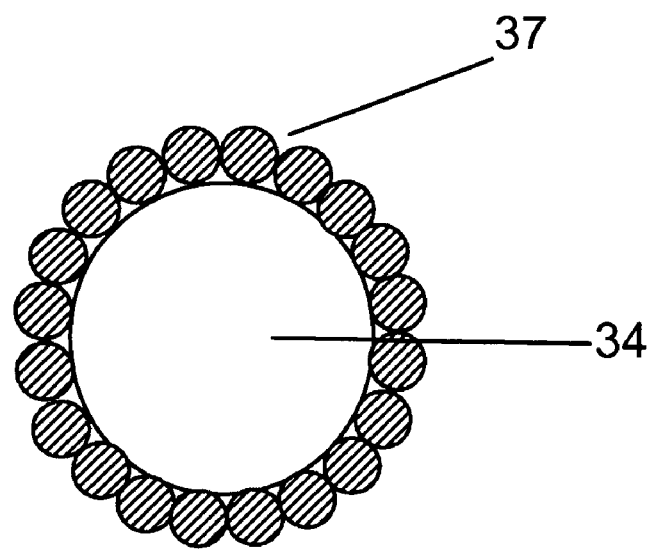

The operation of this embodiment is similar to that of FIGS. 6A and 6B, with the exception that the quantum dot particles 37 are not attached to the surface of the fiber, but are an integral part of its structure, alternating with control wire segments 38. Because they are easily self-assembled in chemical solutions, the quantum dot particles 37 may be spherical nanocrystals consisting of a core of semiconductor material surrounded by a passivating shell of crystalline organic material. Dimensions of the core should not exceed the de Broglie wavelength of the carriers to be confined within it. Control wire segments 38 may be metallic and bonded chemically to "molecular tethers" on the quantum dot particles 37. However, the invention is not limited to this particular configuration, and may include quantum dot particles 37 and control wire segments 38 of other shapes made and joined using other materials and methods, including the molecular wires and quantum dots described by Goldhaber-Gordon et. al.

Electrical (or optical) energy may be applied to the control wire segments 38 and directly to the quantum dot particles 37, stimulating them as described above. This stimulation can then affect the properties of the artificial atoms contained in the quantum dot particles 37, including the number of carriers and the energy levels of the carriers. As before, the resulting changes in the artificial atom can dramatically affect its properties as a dopant.

The capabilities of this embodiment are even more limited than the previous one, in that resistive losses across each quantum dot particle 37 will cause the voltage to drop significantly across each segment of the fiber. Thus, each successive artificial atom along the length of the fiber will have a lower voltage (or, for example, illumination) than the one before it. Thus, the artificial atoms cannot be individually controlled and will not be identical. Instead, the user may select a sequence of artificial elements, of successively lower energies, to be presented by the fiber. For example, the fiber might contain a number of artificial atoms bearing atomic number 6, followed by a number bearing atomic number 5, and so on. This is far from the ideal form of a programmable dopant fiber, but it does provide a unique doping capability.

From the description above, the programmable dopant fiber can be seen to provide a number of capabilities that are not possible with the prior art. First, the present invention provides the ability to place programmable dopants in the interior of bulk materials and to control the properties of these dopants in real time, through external signals. In contrast, the properties of dopants based solely on quantum dot particles can only be controlled at the time of manufacture.

Second, the present invention provides the ability to form programmable materials containing "artificial atoms" of diverse types. In contrast, programmable materials based on nanoparticle films can contain only multiple instances of one "artificial element" at a time.

Also from the above description, several advantages over the prior art become evident. First, materials based on programmable dopant fibers will, in general, be much stronger than materials based on nanoparticle films. Second, programmable dopant fibers can be used in numerous applications where quantum dots and quantum wires are presently employed. However, the programmable dopant fiber provides isolated energy channels for the optical or electrical stimulation of the quantum dots, permitting the quantum dots to be excited without also affecting the surrounding medium or materials. For example, light can be passed through a quantum dot by means of the fiber, without also being shined on or through surrounding areas, except through the fiber itself. Similarly, an electrical voltage can be placed across a quantum dot without passing through the surrounding medium, except through the fiber. Thus, programmable dopant fibers can be used in numerous applications where ordinary quantum dot devices or particles would not operate, or would disrupt the surrounding material in uncontrolled ways.

Accordingly, it should be recognized that the programmable dopant fiber of this invention can be used as a real-time programmable dopant inside bulk materials, as a building block for new materials with unique properties, and as a substitute for quantum dots and quantum wires in various applications (e.g., as a light source or laser light source).

Although the description above contains much specificity, this should not be construed as limiting the scope of the invention but merely as providing illustrations of some of the presently preferred embodiments of this invention. Numerous other variations may exist which do not affect the core principles of the invention's operation. For example, the fiber could have non-circular shapes in cross-section, including a flat ribbon with quantum dots on one or both sides; the "artificial atoms" could be composed of charge carriers other than electrons; the control wires could be replaced with semiconductor, superconductor, optical fiber, or other conduits for carrying energy; the control wires could be antennas for receiving signals and energy from electromagnetic waves; any of the embodiments listed here could be replicated on a molecular scale through the use of specialized molecules such as carbon nanotube wires and fullerene quantum dot particles; the quantum dots could be other sorts of particles or devices than those discussed herein, so long as they accomplish the quantum confinement necessary for the formation of artificial atoms; and the number and relative sizes of the quantum dots with respect to the fiber could be significantly different than is shown in the drawings.

Thus the scope of the invention should be determined by the appended claims and their legal equivalents, rather than by the examples given.

We claim:

1. A method for real-time control of dopants in the interior of a bulk material, after a time of initial manufacture, the method comprising
   carrying energy through at least one conduit in the bulk material to a plurality of confinement regions;
   confining one or more charge carriers within each of the plurality of confinement regions in the bulk material to form respective artificial atoms that have a doping effect upon the bulk material;
   controlling the energy carried to the plurality of confinement regions; and
   adjusting an energy level or quantity of the one or more charge carriers forming each respective artificial atom in real time;
   to alter the doping effect on the bulk material.

2. The method of claim 1, wherein each of the plurality of confinement regions comprises a quantum dot particle.

3. The method of claim 1, wherein each of the confinement regions comprises a quantum dot device in which the one or more charge carriers are confined by the energy in at least one dimension by an electrical bias.

4. The method of claim 1, wherein the step of controlling further comprises varying an applied voltage across each of the plurality of confinement regions to increase or decrease the number of the one or more charge carriers confined in each of the plurality of confinement regions.

5. A method for real-time control of dopants in the interior of a bulk material, after a time of initial manufacture, the method comprising
   carrying energy through at least one conduit in the bulk material to each of a plurality of confinement regions without the energy directly contacting the bulk material except through the at least one conduit;
   confining a plurality of charge carriers within the plurality of confinement regions in the bulk material to form a respective plurality of artificial atoms that have a doping effect on the bulk material, wherein each of the plurality of confinement regions contains a respective subset of the plurality of charge carriers; and
   adjusting the energy to change the form of at least a first subset of the artificial atoms in real time by changing a quantity of charge carriers within respective confinement regions for the subset of the artificial atoms or by changing an energy level of certain charge carriers within the respective confinement regions for the first subset of the artificial atoms, thus altering the doping effect on the bulk material.

6. The method of claim 5, wherein each of the plurality of confinement regions comprises a quantum dot particle.

7. The method of claim 5, wherein each of the plurality of confinement regions comprises a quantum dot device in which the one or more charge carriers are confined by the energy in at least one dimension by an electrical bias.

8. The method of claim 5, wherein the step of adjusting further comprises varying an applied voltage across the respective confinement regions to increase or decrease the number of the charge carriers confined in the respective confinement regions.

9. The method of claim 5, wherein the step of adjusting further comprises activating a switch interposed between the at least one conduit and the respective confinement regions.

10. The method of claim 5, further comprising adjusting the energy to change the form of a second subset of the artificial atoms in real time by changing a quantity of charge carriers in respective confinement regions for the second subset of the artificial atoms or by changing an energy level of certain charge carriers in the respective confinement regions for the second subset of the artificial atoms, wherein the quantity of charge carriers within the respective confinement region for the second subset of the artificial atoms is different than the quantity of charge carriers within the respective confinement regions for the first subset of the artificial atoms or the energy level of the certain charge carriers within the respective confinement regions for the second subset of the artificial atoms is different than the energy level of the certain charge carriers within the respective confinement region for the first subset of the artificial atoms, or both.

11. A method for real-time control of an artificial atom fixed in a fiber material, wherein the fiber material comprises
a control wire;
a first baffler layer surrounding the control wire;
a transport layer surrounding the first baffler layer;
a second barrier layer surrounding the transport layer, wherein the first baffler layer, the transport layer, and the second baffler layer together form a quantum well;
an electrode defining an area of quantum confinement in the quantum well; and
a branch wire connecting the control wire and the electrode to provide level of energy to the electrode; and
wherein the method comprises
applying a voltage across the electrode to confine a number of charge carriers within the quantum well to form the artificial atom; and
varying the voltage across the electrode to increase or decrease the number of charge carriers confined within the quantum well.

12. A method for real-time control of artificial atoms fixed in a fiber material, wherein the fiber material comprises
a control wire; and
a plurality of nanocrystals bonded to an exterior surface of the control wire, wherein each of the plurality of nanocrystals comprises
a core of conductive or semiconductive material smaller than the de Broglie wavelength of a charge carrier; and
a passivating shell of insulating material surrounding the core; and wherein the method comprises
applying a voltage across each of the plurality of nanocrystals to confine a number of charge carriers within each of the plurality of nanocrystals to form a respective artificial atom; and
varying the voltage across each of the plurality of nanocrystals to increase or decrease the number of charge carriers confined within the respective artificial atom.

13. The method of claim 12, wherein the control wire comprises a plurality of control wires and each of the plurality of control wires is connected to an adjacent control wire via at least one of the plurality of nanocrystals.

14. The method of claim 1, wherein the alteration to the doping effect changes an electrical, optical, thermal, magnetic, mechanical, and/or chemical property of the bulk material.

15. The method of claim 5, wherein the alteration to the doping effect changes an electrical, optical, thermal, magnetic, mechanical, and/or chemical property of the bulk material.

16. A method for real-time control of dopants in the interior of a bulk material, the method comprising
electrically biasing a plurality of confinement regions within the bulk material;
forming by electrical bias a plurality of artificial atoms in respective confinement regions within the bulk material;
carrying energy through one or more conduits in the bulk material to at least a subset of the confinement regions;
adjusting the energy carried to the subset of confinement regions in real time to change an energy level or quantity of one or more charge carriers in each of a respective subset of the artificial atoms; and
creating a real-time, programmable doping effect in the bulk material through the changes to the subset of artificial atoms.

* * * * *

UNITED STATES PATENT AND TRADEMARK OFFICE
CERTIFICATE OF CORRECTION

PATENT NO. : 7,276,432 B2  Page 1 of 1
APPLICATION NO. : 11/081778
DATED : October 2, 2007
INVENTOR(S) : McCarthy et al.

It is certified that error appears in the above-identified patent and that said Letters Patent is hereby corrected as shown below:

Column 13;

- In claim 11, on lines 10, 11, 13 and 14, delete "baffler" in each occurrence and insert --barrier--, therefor.

- In claim 11, line 18, after the word "provide" insert --a--.

Signed and Sealed this

Tenth Day of June, 2008

JON W. DUDAS
*Director of the United States Patent and Trademark Office*